US011907699B2

(12) United States Patent
Chen

(10) Patent No.: US 11,907,699 B2
(45) Date of Patent: Feb. 20, 2024

(54) SYSTEM AND METHOD FOR IMPLEMENTING SELF-DRIVEN CHANGE DETECTION RELEASE AUTOMATION

(71) Applicant: JPMorgan Chase Bank, N.A., New York, NY (US)

(72) Inventor: Fei Chen, London (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 93 days.

(21) Appl. No.: 17/192,416

(22) Filed: Mar. 4, 2021

(65) Prior Publication Data

US 2021/0279050 A1  Sep. 9, 2021

Related U.S. Application Data

(60) Provisional application No. 62/984,826, filed on Mar. 4, 2020.

(51) Int. Cl.
*G06F 8/65* (2018.01)
*G06F 8/71* (2018.01)
*G06F 9/48* (2006.01)

(52) U.S. Cl.
CPC .................. *G06F 8/65* (2013.01); *G06F 8/71* (2013.01); *G06F 9/4843* (2013.01)

(58) Field of Classification Search
CPC ............. G06F 8/65; G06F 8/71; G06F 9/4843
See application file for complete search history.

(56) References Cited

U.S. PATENT DOCUMENTS

| 8,245,219 | B2* | 8/2012 | Agarwal | G06F 8/65 |
| | | | | 717/172 |
| 8,661,428 | B2* | 2/2014 | Clark | G06F 16/1844 |
| | | | | 717/169 |
| 9,940,123 | B1* | 4/2018 | Ayoub | G06F 13/4295 |
| 10,671,373 | B1* | 6/2020 | Walker | G06F 8/65 |
| 2003/0093688 | A1* | 5/2003 | Helgesen | G06F 8/658 |
| | | | | 726/27 |
| 2006/0168564 | A1* | 7/2006 | Zhang | G06F 8/60 |
| | | | | 717/121 |
| 2008/0196081 | A1* | 8/2008 | Hajji | G06F 21/57 |
| | | | | 726/1 |
| 2012/0324435 | A1* | 12/2012 | Somani | G06F 8/30 |
| | | | | 717/170 |
| 2017/0177877 | A1* | 6/2017 | Suarez | G06F 16/2455 |
| 2018/0157466 | A1* | 6/2018 | Jubran | G06F 8/00 |
| 2018/0349125 | A1* | 12/2018 | Ito | H04N 1/00344 |
| 2019/0243629 | A1* | 8/2019 | Gass | G06F 8/40 |

* cited by examiner

*Primary Examiner* — Daxin Wu
(74) *Attorney, Agent, or Firm* — GREENBLUM AND BERNSTEIN, P.L.C.

(57) ABSTRACT

An embodiment of the present invention is directed to a system and method for implementing a self-driven change detection release automation. According to an embodiment of the present invention, a software release bot may be created and installed on software running environment. The bot may further detect changes on a server environment. For example, the bot may be integrated with scheduling and other tools where the bot is programmed to wake up at predetermined time intervals, e.g., 15 minutes. According to an embodiment of the present invention, the bot may handle release activities defined in the configuration, e.g., stop, start, send notification, etc. The bot is able to save release events log for change audit.

20 Claims, 10 Drawing Sheets

```
$
$ cat rmHostType.txt rmReleaseList.txt
#hostname=type=type2=instance=aimspace
2p348=dpetl=ces=0=/aim/gfs/quad/   -central=/aim/gfs/config/   =/aim/gfs/config/one
2p349=dpetl=ces=1=/aim/gfs/quad/   -central=/aim/gfs/config/   =/aim/gfs/config/one
2p360=dpetl=ces=0=/aim/gfs/quad/   -central=/aim/gfs/config/   =/aim/gfs/config/one
2p361=dpetl=ces=1=/aim/gfs/quad/   -central=/aim/gfs/config/   =/aim/gfs/config/one
2p374=cc20=cc10=NA=/aim/gfs/quad/  -central=/aim/gfs/config/
2p375=cc20=cc10=NA=/aim/gfs/quad/  -central=/aim/gfs/config/
2p376=cc20=cc10=NA=/aim/gfs/quad/  -central=/aim/gfs/config/
2p377=cc20=cc10=NA=/aim/gfs/quad/  -central=/aim/gfs/config/
2p330=dpetl=ccces=NA=/aim/gfs/quad/ -central=/aim/gfs/config/
dpetl=aimquadcheck= -processing=ENV_DEF/management/stop.sh ENV_DEF INSTANCE_DEF=ENV_DEF INSTANCE_DEF=ENV_DEF/management/start.sh ENV_DEF INSTANCE_DEF
dpetl=aimquadcheck= -processing=ENV_DEF/management/stop.sh ENV_DEF INSTANCE_DEF=ENV_DEF INSTANCE_DEF=ENV_DEF/management/start.sh ENV_DEF INSTANCE_DEF
$
$
```

Figure 3

```
getLinkUpdateTimeInMinutes () {
    aimPath=$1                                                              ———— 410
    currentTimeInSeconds=`date +%s`
    linkUpdateTimeInSeconds=`date +%s -r $aimPath`
    timeIntervalSeconds=`expr $currentTimeInSeconds - $linkUpdateTimeInSeconds`
    timeIntervalMinute=`expr $timeIntervalSeconds / 60`
    timeIntervalHours=`expr $timeIntervalMinute / 60`
    timeIntervalHoursMinutes=`expr $timeIntervalHours % 60`
    timeDays=`expr $timeIntervalHours / 24`
    ls -ltr $aimPath
    echo "aimlink updated $timeIntervalMinute minutes ago, $timeIntervalHours hours $timeIntervalHoursMinutes minutes ago, $timeDays days ago."
    #echo $timeIntervalMinute
```
                                                        ╲__ 412

Figure 4

```
getLinkUpdateTimeInMinutes $aimPath if [ [ $timeIntervalMinute -lt $aimUpdateCheckInterval ] ]; then
    ((counter++))
    echo " "
    echo "################################ " | tee -a ${DetailLogFile}                    510
    echo ">>>>>>>>>>> $counter micro service module" | tee -a ${DetailLogFile}
    getLinkUpdateTimeInMinutes $aimPath   | tee -a ${DetailLogFile}
    if [ $type = "cc10" ]; then
```

```
stop and start service
echo "#ps pre check" | tee -a ${DetailLogFile}
ps -ef | grep $aimruVar | tee -a ${DetailLogFile}
echo "## stop... `date`" | tee -a ${DetailLogFile}
echo ">>$stopCmd" | tee -a ${DetailLogFile}                                   512
$stopCmd | tee -a ${DetailLogFile}
$stopCmd &
sleep 30 | tee -a ${DetailLogFile}
echo "### start... `date`" | tee -a ${DetailLogFile}
echo ">>$startCmd" 1 tee -a ${DetailLogFile}                                  514
$startCmd | tee -a ${DetailLogFile}
$startCmd &
echo "#### ps post check" | tee -a ${1DetailLogFile}
sleep 10                                                                      516
ps -ef | grep $aimruVar | tee -a ${DetailLogFile} data collection and analysis
echo '" date '+A'' ` date +"%H:%M"' `$aimQuadNamespace/$aimruVar:`hostname`:`whoami`'" >> ${MLDataFile}
python processData.py > ${MLSecondData}
sort ${MLSecondData} | uniq -ci > ${MLPatternData}
```

Figure 5

```
aim check do release    p349-Fri Jan 24 17:36:01 GMT 2020
#################################################
>>>>>>>>>>> 1 micro service module
lrwxrwxrwx 1 root root 94 Jan 24 17:26 /aim/gfs/quad/    -central/    -processing/pte -> /aim/gfs/quad/    -central/    -processing/9.0.23-2020.01
.24_04.01-444fdf6bf
aimlink updated 9 minutes ago, 0 hours 0 minutes ago, 0 days ago.
#ps pre check
a_    13203 13123 0 17:36 ?        00:00:00 grep    -instructions-processing                                                                          — 610
a_    23828 1 5 Jan23 ?             01:26:14 ?       cc_    Processing1 -server -Xms1024M -Xmx2048M -XX:MaxMetaspaceSize=2048M -DSpring.profiles.active=pte -XX:+PrintGCData
ils -XX:-PrintGCApplicationStoppedTime -XX:+PrintGCDateStamps -XX:+PrintGCApplicationConcurrentTime -XX:+PrintGCTimeStamps -XX:+PrintTenuringDistribution -XX:+UseGCLogFileRotation -X
X:GCLogFileSize=50M -XX:NumberOfGCLogFiles=20 -Xloggc:logs/gc-%t.log -jar /aim/gfs/quad/    -central/    -processing/pte/jars/    -processor.jar --spring.co
nfig.location=classpath:application.properties/    config/    -central/    -processor/pte/application-pte.properties
stop... Fri Jan 24 17:36:01 GMT 2020
>>/aim/gfs/quad/    -central/    -processing/pte/management/stop.sh pte 1
pkill -9 -f mac_cc_dp_instructionsProcessing1                                        612 sleep 3
sending an email
sleep 30
start... Fri Jan 24 17:36:34 GMT 2020                                             614
>>/aim/gfs/quad/    -central/    -processing/pte/management/start.sh pte 1
writing running processes to the log file
a_    14973 13123 0 17:36 ?        00:00:00 /bin/sh /aim/gfs/quad/    -central/    -processing/pte/management/start.sh pte 1
The number of processes is 0
writing a space to the log file
                                                                                     616
writing a space to the log file starting the application
checking https://localhost:8084/actuator/health ... Fri Jan 24 17:36:35 GMT 2020
```

Figure 6

```
checking https://localhost:8084/actuator/health ... Fri Jan 24 17:38:52 GMT 2020
sending a success email
writing running processes to the log file
                                            ─── 710
a ▮ 14973 13123 0 17:36 ?        00:00:00 /bin/sh /aim/gfs/quad/███████s-processing/pte/management/start.sh pte 1
a_▮ 14996 14973 99 17:36 ?       00:04:48 ███████sProcessing1 -server -Xms1024M -Xmx2048M -XX:MaxMetaspaceSize=2048M -DSpring.profiles.active=pte -XX:+PrintGCData
ils -XX:-PrintGCApplicationStoppedTime -XX:+PrintGCDateStamps -XX:+PrintGCTimeStamps -XX:+PrintTenuringDistribution -XX:+UseGCLogFileRotation -X
X:GCLogFileSize=50M -XX:NumberOfGCLogFiles=20 -Xloggc:logs/gc-%t.log -jar /aim/gfs/quad/███████s-processing/pte/jars/███████.jar --spring.co
nfig.location=classpath:application.properties,███████-processor/pte/application-pte.properties
                                              ███████-central/
sending an email
```

SYSTEM AND METHOD FOR IMPLEMENTING SELF-DRIVEN CHANGE DETECTION RELEASE AUTOMATION

CROSS REFERENCE TO RELATED APPLICATIONS

The application claims priority to U.S. Provisional Application 62/984,826, filed Mar. 4, 2020, the contents of which are incorporated herein in their entirety.

FIELD OF THE INVENTION

The invention relates generally to a system and method for implementing self-driven change detection release automation.

BACKGROUND OF THE INVENTION

Software release process is a critical part of end-to-end software development life cycle (SDLC), and it is understood to be a continuous process. Continuous Integration (CI) and Continuous Delivery (CD) best practices have been studied and utilized by many private and open source projects. However, current CI and CD processes require extensive manual steps, resource provisions, administration work, numerous CI/CD tools, and extensive user input to trigger release events. The current process demands extensive resources, high costs and human dependencies thereby resulting in a high risk of errors and frequent delays in software releases.

These and other drawbacks exist.

SUMMARY OF THE INVENTION

According to one embodiment, the invention relates to a system that implements a self-driven change detection release automation in software development life cycle. The system comprises: a memory component that stores change detection data; a user interface that receives inputs via a communication network; a system interface that is communicatively coupled to one or more servers in a server environment; and a computer processor coupled to the memory component, the user interface and the system interface and further programmed to perform the steps of: executing, via the system interface, a software release bot on the server environment; automatically detecting, via a signal received from the software release bot, one or more changes on the server environment; initiating one or more corresponding actions defined in a configuration file; wherein the corresponding actions comprise: performing a pre-check process, executing a stop application of a current version, and executing a start application of an updated version; automatically saving one or more events as an events log; performing one or more post-check validations; generating a notification of one or more release updates; and communicating, via the communication network, the notification to at least one recipient.

According to another embodiment, the invention relates to a method that implements a self-driven change detection release automation in software development life cycle. The method comprises the steps of: executing, via a system interface, a software release bot on a server environment wherein the system interface is communicatively coupled to one or more servers in the server environment; automatically detecting, via a signal received from the software release bot, one or more changes on the server environment; initiating, via a computer processor, one or more corresponding actions defined in a configuration file; wherein the corresponding actions comprise: performing a pre-check process, executing a stop application of a current version, and executing a start application of an updated version; automatically saving one or more events as an events log; performing one or more post-check validations; generating a notification of one or more release updates; and communicating, via a communication network, the notification to at least one recipient.

An embodiment of the present invention may involve a specially programmed computer system comprising one or more computer processors, interactive interfaces, electronic storage devices, and networks. The computer implemented system and method described herein provide unique advantages to entities, users and other participants, according to various embodiments of the invention. An embodiment of the present invention achieves significant benefits and advantages through the self-driven change detection release automation. A self-driven and self-service model achieves efficiencies in release processes with significantly less dependencies. The innovative system provides a repeatable process with quality control and requires significantly less human tasks thereby minimizing errors/mistakes, inconsistencies and other inefficiencies. An embodiment of the present facilitates and streamlines change events logging and audit review and further provides built-in notifications to optimize change communication and significantly reduce infrastructure cost, administration efforts and dependencies when CI/CD tools are used.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 3 is an exemplary interactive user interface, according to an embodiment of the present invention.

FIG. 4 is an exemplary interactive user interface, according to an embodiment of the present invention.

FIG. 5 is an exemplary interactive user interface, according to an embodiment of the present invention.

FIG. 6 is an exemplary interactive user interface, according to an embodiment of the present invention.

FIG. 7 is an exemplary interactive user interface, according to an embodiment of the present invention.

FIG. 8 is an exemplary interactive user interface, according to an embodiment of the present invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

In an enterprise environment, software development life cycle (SDLC) requires continuous code changes and releases. As a result, new concepts of continuous integration (CI) and continuous delivery (CD) have been developed and used to improve the speed of delivery. However, using CI/CD tools involves additional infrastructure resources including CPU, memory, disk space as well as significant administration tasks. Accordingly, it is a challenge for existing projects to integrate with CI and/or CD tools and further achieve automation on release. Other factors relate to existing infrastructure setup, established development process, and various release tools used in the SDLC process. As a result, current release processes require heavy manual work and effort to manage and operate in a timely and efficient manner. Current solutions also require CI/CD tools and various tasks. This is common in current software project SDLC processes. For multiple micro services, even more resources and efforts are required.

An embodiment of the present invention is directed to a self-service release process model that significantly minimizes or eliminates human involvement thereby simplifying setup, reducing potential user error and significantly minimizing change risk.

According to an embodiment of the present invention, a software release bot may be created and installed on a software running environment. The software release bot may detect changes on a server environment. For example, change detection may involve checking the timestamp, type of change, type version, etc. In addition, the bot may be integrated with scheduling and other tools where the bot is programmed to wake up at predetermined time intervals, e.g., 15 minutes. Other thresholds and conditions may be applied. According to an embodiment of the present invention, the bot may handle release activities defined in a configuration file. The release activities may include stop, start, send notification, etc. In addition, the bot may be directed to developing a release events log for change audits and other auditing and management tasks.

Figure 1:
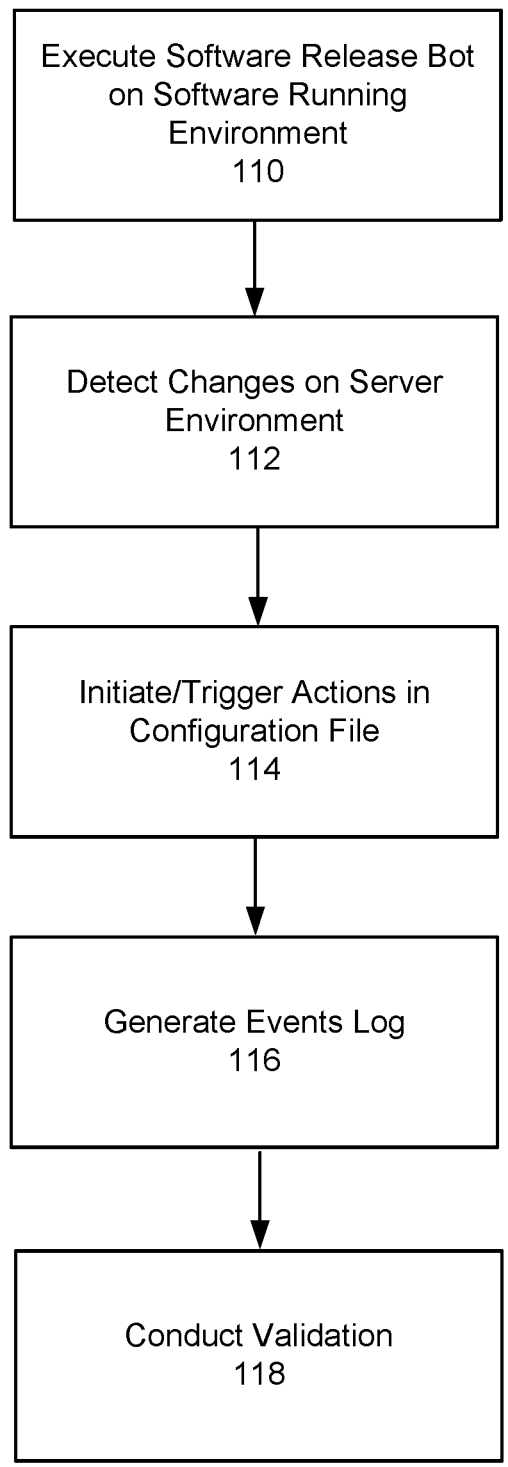
FIG. 1 is an exemplary process flow, according to an embodiment of the present invention.

FIG. 1 is an exemplary process flow, according to an embodiment of the present invention. At step 110, a software release bot may be executed on a software running environment. At step 112, one or more changes on a server environment may be detected. At step 114, actions may be initiated/triggered pursuant to a configuration file. At step 116, events may be saved as an events log. At step 118, validation may be conducted. While the process of FIG. 1 illustrates certain steps performed in a particular order, it should be understood that the embodiments of the present invention may be practiced by adding one or more steps to the processes, omitting steps within the processes and/or altering the order in which one or more steps are performed. The steps will be described in more detail below.

At step 110, a software release bot may be executed on a software running environment. The software release bot may be executed on a single server (e.g., central server), multiple servers at the same location, distributed across a region, etc. The same (or similar, modified) software release bot may be executed on multiple servers and locations. Other configurations and architectures are supported. For example, the software release bot execution may depend on the host environment, content and/or other factors and considerations.

At step 112, one or more changes on a server environment may be detected. Detecting changes may relate to timestamps, checksum, message digest, hash, etc. The changes may compare a current value to a previous value or metric. For example, a change in time may be detected by a change as determined by a timestamp check. In another example, while a file content may not be accessed, a corresponding hash value may be checked. A hash may be compared to a previous hash to determine whether a change in the content has occurred. Other comparisons or calculations to determine a change may be implemented.

At step 114, actions may be initiated/triggered pursuant to a configuration file. The actions may be configured or software driven so that when a change is detected, a corresponding action or a series of actions may be executed. For example, when a change is detected, an embodiment of the present invention may determine whether the software or application is currently running. If not, no action is taken. If yes, the software or application may be stopped, paused and then restarted with an updated version of the software or application. This enables the software or application to be loaded in memory and then executed to serve a new or current request. Accordingly, the change may be executed in run time.

According to an embodiment of the present invention, the configuration file may define the actions for self-driven automation. The configuration file may provide a mapping between services and actions. The configuration file may be set up initially and is generally content driven and flexible. Actions may include checking a process, stopping a process, starting a process, performing a health check including validations, confirmations, etc. According to an embodiment of the present invention, the configuration file is content based and provides a flexible aspect of the self-driven automation features. The configuration file may be updated to support additional and/or different services without having to change the software or application.

At step 116, events may be saved as an events log. The events may represent any action taken by the software bot. The events log may support audit and security purposes. Actions may relate to operation, security, management, etc. More specifically, event 1 may represent check a running process; event 2 may represent stop a process; event 3 may represent start or restart a process; event 4 may represent perform a health check. In addition, if an issue arises, the events log may provide the ability to roll back to an earlier version and thereby minimize risk and loss of critical and relevant information.

At step 118, validation may be conducted. Validations may include health checks and other validations and confirmations that actions, events and/or updates were performed correctly.

According to an exemplary scenario, a software or application may run a current version (e.g., version 1) and then determine that an updated version (e.g., version 2) is available. A software bot or agent may detect a change that reflects the availability of version 2. In response, the software bot or agent may determine whether a current application is running and if so, stop the application, load the updated version and then execute the updated version to serve a current or new request. The update may involve a single application or multiple applications. An embodiment of the present invention is scalable to a single service as well as many services.

An embodiment of the present invention may be relevant to change management, development, operation and management within SDLC (software development life cycle).

Figure 2:
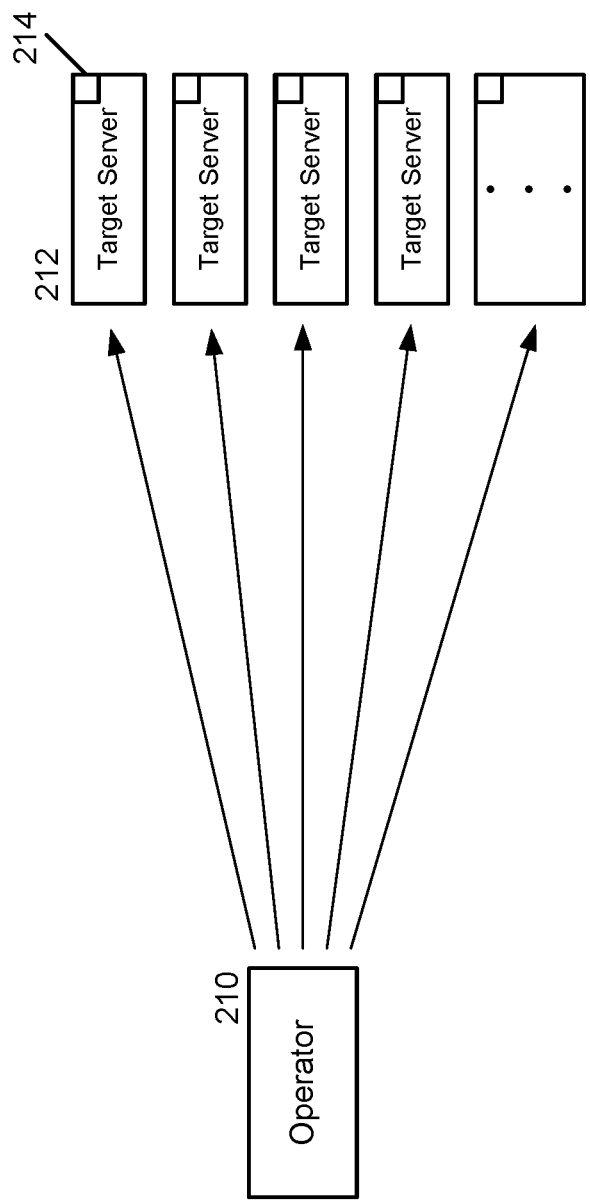
FIG. 2 is an exemplary system diagram, according to an embodiment of the present invention.

FIG. 2 is an exemplary system diagram, according to an embodiment of the present invention. According to an embodiment of the present invention, release metadata may be defined in configuration files to achieve flexibility in software maintenance and updates. An embodiment of the present invention may be directed to a release bot program that calculates file or release software update timestamps (or other indication of change) on a local server. One or more release actions may be triggered based on a configuration file. An embodiment of the present invention may conduct pre-check and post-check validations, which may represent small validations, checks and/or confirmations.

As shown in FIG. 2, Operator 210 may communicate with various servers, represented by Target Server 212. The servers may be represented in a single system, single location. In another example, the servers may be distributed across multiple systems, platforms and locations. Various implementations and architectures may be supported. According to an embodiment of the present invention, the release bot software may be installed on a server, such as Target Server 212. The release bot may perform various actions, including detect changes, trigger actions in a predefined configuration file, etc. For example, the software installation file system may be presented on target servers via a common network or shared file systems. An embodiment of the present invention reduces intermediate tools, substantially minimizes or eliminates user tasks and further achieves self-driven change detection and action.

As shown in FIG. 2, release bot 214 may be represented as a local lightweight program that self-detects changes. Release bot 214 may perform various actions including, for example, wake up local release jobs, restart software, validate change and/or process, etc. According to an embodiment of the present invention, release bot 214 requires minimum maintenance and may be part of a software bundle. Other implementations and variations may be realized.

FIG. 3 is an exemplary interactive user interface, according to an embodiment of the present invention. FIG. 3 represents configuration data that indicates where/when a change should be detected. The configuration data also defines an action to execute when an agent detects a particular change. In this exemplary illustration, metadata configuration may be defined. As shown in FIG. 3, 310 represents release metadata configurations. FIG. 3 illustrates various host types, including back end, front end and central servers, where different services can run on different servers with varying action requirements. 312 represents a release file location on a server. 314 represents an action (e.g., stop event) for a release unit or other type of micro services.

FIG. 4 is an exemplary interactive user interface, according to an embodiment of the present invention. FIG. 4 illustrates calculating a file change timestamp. As shown in FIG. 4, a file change timestamp represents a time interval change in minutes, 410 and 412. Other metrics or time intervals may be used. 410 represents a function and 412 checks the time and calculates a difference from the last update. If a change is detected and the change is within a threshold, an action may or may not be taken, as defined by an initial configuration.

FIG. 5 is an exemplary interactive user interface, according to an embodiment of the present invention. FIG. 5 illustrates trigger release actions. As shown in FIG. 5, 510 represents whether a file change time is less than a defined threshold or whether a file has changed. 510 serves as a checkpoint to determine whether the time detected is within a threshold. If a change is detected and it is outside the threshold, a trigger event may be initiated as shown in 512. 512 represents a stop application action or command (e.g., stopCmd). After the stop application action, a sleep or pause action may be initiated to confirm that the application has stopped or shut down properly. 514 represents a start application action or command (e.g., startCmd). This triggers a start command to load or bring up the updated software or new version of software. When the start application is performed, an updated application or other updated software component may be executed. 516 represents a collection of log data for analysis. For example, the log data may include various details such as the action, date/time, host name, server name, function identifier, etc. As shown by 516, data collection and analysis may be performed.

Figure 8:
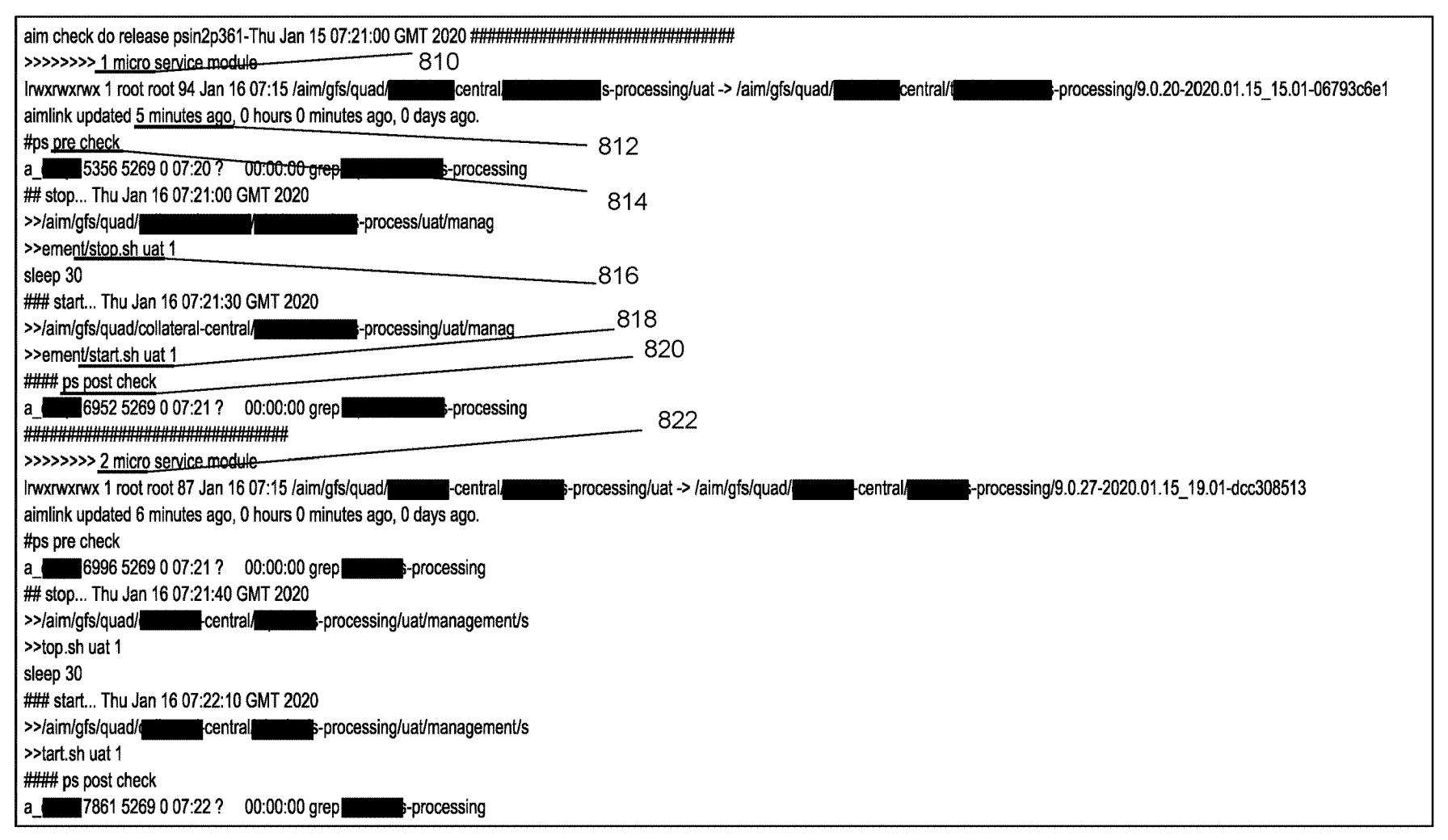

FIGS. 6, 7 and 8 represent interactive interfaces that illustrate an enterprise SDLC process using an embodiment of the present invention. For example, a software release request may be received. An operation team may trigger a software push. In this example, a release bot detects one or more changes on a server and performs a set of actions in an automated manner. The set of actions may include: pre-check; stop; start; post-check; and send notification.

FIG. 6 is an exemplary interactive user interface, according to an embodiment of the present invention. FIG. 6 is an illustration of an exemplary event workflow. As shown in FIG. 6, 610 represents self-detected change in timestamp which is followed by a pre-check process. Because a change has been detected, an embodiment of the present invention will stop the process because the software is outdated in this example. 612 represents a stop application action. There may be a brief pause or sleep action that ensures that the process has stopped properly. 614 and 616 represent a start application action which involves loading a new version of the application.

FIG. 7 is an exemplary interactive user interface, according to an embodiment of the present invention. As shown in FIG. 7, 710 represents a process that has started and is running. An embodiment of the present invention may perform a health check to validate the stop, stop and/or update process. With an embodiment of the present invention, intermediate tools are reduced with minimal or no user tasks and self-driven change detection and action. As shown by FIG. 7, a notification may be generated and sent to confirm that the updated process is now running. If an issue is detected, an alert or other communication may be transmitted to one or more recipients.

FIG. 8 is an exemplary interactive user interface, according to an embodiment of the present invention. FIG. 8 illustrates a notification automatically generated by an embodiment of the present invention. An embodiment of the present invention is directed to notification of release updates in a communication. A communication (e.g., email, text, portal communication, etc.) may be automatically generated and transmitted to one or more recipients or receiving systems, applications or services. The notification may provide change detection data and status. In addition, the recipient may respond and/or otherwise communicate back with additional follow-up actions.

FIG. 8 illustrates an exemplary workflow. As shown in FIG. 8, 810 represents a first application shown as "1 micro service module." 812 represents a detection of a file or software change. 814 represents a pre-check process. The pre-check process may run validations and confirmations prior to stopping the application. 816 represents a stop application action. 818 represents a start application action where an updated version may be executed. This may involve loading an updated version in memory and then executing the updated version. 820 represents a post-check process. The post-check process may confirm that the process was started properly. The post-check may run small validations to verify that the software is executing properly. 822 represents a second application shown as "2 micro service module." As shown in FIG. 8, changes in two micro service modules have been detected.

Figure 9:
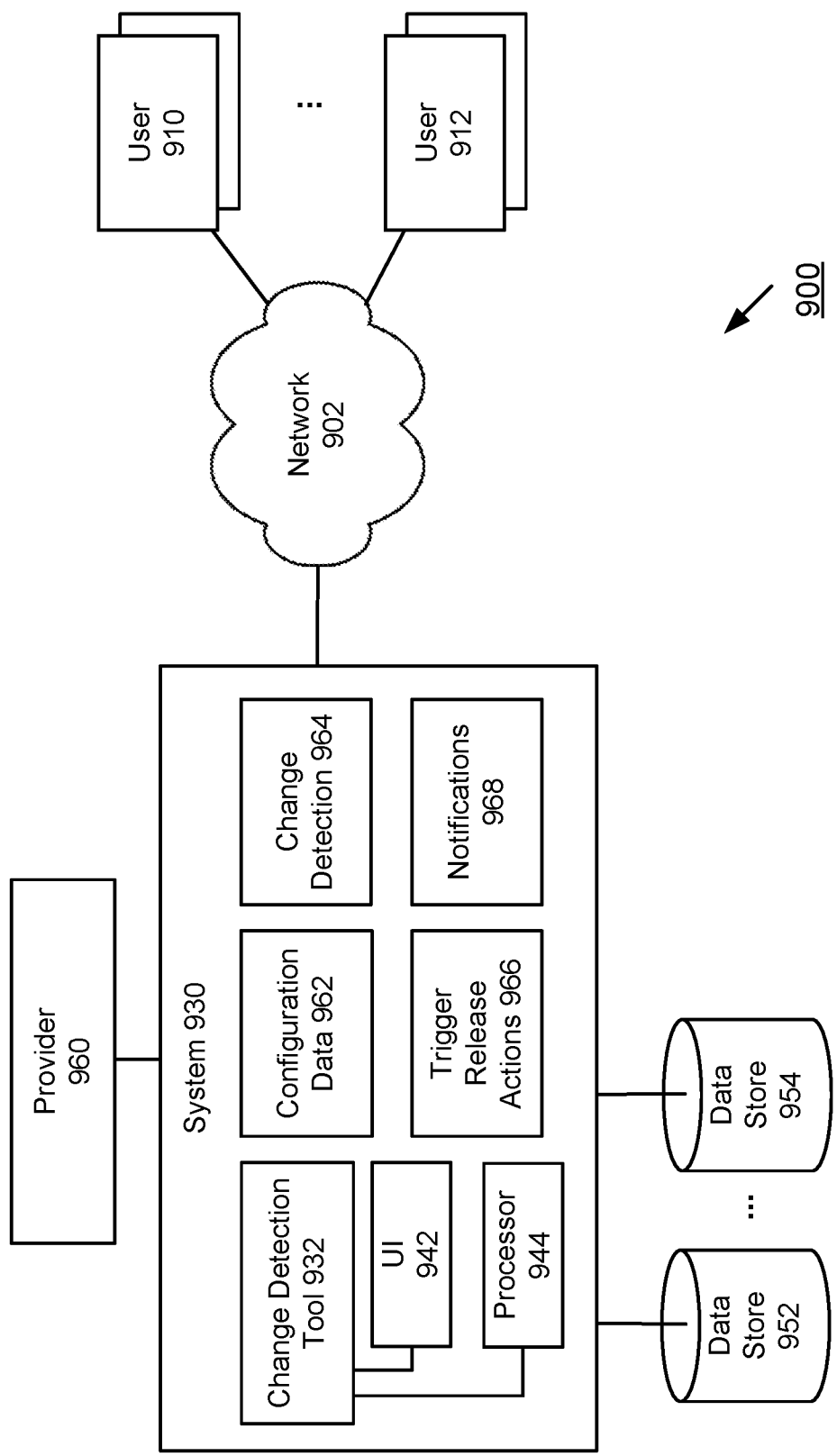
FIG. 9 is an exemplary system diagram, according to an embodiment of the present invention.

FIG. 9 is an exemplary system diagram, according to an embodiment of the present invention. Users 910, 912 may interact with an embodiment of the present invention provided by System 930 through Network 902. As illustrated in FIG. 9, Users 910, 912 may use various computing devices, such as computers, laptops, workstations, kiosks, terminals, tablets, mobile devices, mobile phones, smart devices, or other computing devices capable of sending or receiving processing signals. For example, computing devices may have an application installed that is associated with an Entity that operates System 930. System 930 may be integrated with various systems and applications that support SDLC processes. As shown in FIG. 9, System 930 may include a Change Detection Tool 932 that provides self-driven change detection release automation in software development life cycle. While FIG. 9 illustrates individual devices or components, it should be appreciated that there may be several of such devices to carry out the various exemplary embodiments.

Change Detection Tool 932 may incorporate modules and other functions, such as User Interface (UI) 942 and Processor 944. Other modules may include Configuration Data 962, Change Detection 964, Trigger Release Actions 966 and Notifications 968. These modules are exemplary and illustrative, Change Detection Tool 932 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System 930 may be communicatively coupled to data storage devices represented by Data stores 952, 954. Also, Data stores 952, 954 may also store and maintain source code, configuration files and data, event data, change data, reports, performance data, analytics, etc. The self-driven change detection release automation features described herein may be provided by an Entity and/or a third party provider, represented by 960, where Provider 960 may operate with System 930 and/or an Entity.

The system 900 of FIG. 9 may be implemented in a variety of ways. Architecture within system 900 may be implemented as hardware components (e.g., module) within one or more network elements. It should also be appreciated that architecture within system 900 may be implemented in computer executable software (e.g., on a tangible, non-transitory computer-readable medium) located within one or more network elements. Module functionality of architecture within system 900 may be located on a single device or distributed across a plurality of devices including one or more centralized servers and one or more mobile units or end user devices. The architecture depicted in system 900 is meant to be exemplary and non-limiting. For example, while connections and relationships between the elements of system 900 is depicted, it should be appreciated that other connections and relationships are possible. The system 900 described below may be used to implement the various methods herein, by way of example. Various elements of the system 900 may be referenced in explaining the exemplary methods described herein.

Network 902 may be a wireless network, a wired network or any combination of wireless network and wired network. For example, Network 902 may include one or more of an Internet network, a satellite network, a wide area network ("WAN"), a local area network ("LAN"), an ad hoc network, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11g, 802.11n, 802.11ac, or any other wired or wireless network for transmitting or receiving a data signal. Also, Network 902 may support an Internet network, a wireless communication network, a cellular network, Bluetooth, or the like, or any combination thereof. Network 902 may further include one, or any number of the exemplary types of networks mentioned above operating as a stand-alone network or in cooperation with each other. Network 902 may utilize one or more protocols of one or more network elements to which it is communicatively coupled. Network 902 may translate to or from other protocols to one or more protocols of network devices. Although Network 902 is depicted as one network for simplicity, it should be appreciated that according to one or more embodiments, Network 202 may comprise a plurality of interconnected networks, such as, for example, a service provider network, the Internet, a cellular network, corporate networks, or even home networks, or any of the types of networks mentioned above.

Data may be transmitted and received via Network 902 utilizing a standard networking protocol or a standard telecommunications protocol. For example, data may be transmitted using Session Initiation Protocol ("SIP"), Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet Protocols ("TCP/IP"), hypertext transfer protocol ("HTTP"), hypertext transfer protocol secure ("HTTPS"), real time streaming protocol ("RTSP"), or other protocols and systems suitable for transmitting and receiving data. Data may be transmitted and received wirelessly or in some cases may utilize cabled network or telecom connections such as an Ethernet RJ45/Category 5 Ethernet connection, a fiber connection, a cable connection or other wired network connection.

System 930 may be communicatively coupled to Data Stores 952, 954 as well as remote storages. These storage components may include any suitable data structure to maintain the information and allow access and retrieval of the information. For example, the storage components may keep the data in an organized fashion and may be an Oracle database, a Microsoft SQL Server database, a DB2 database, a MySQL database, a Sybase database, an object oriented database, a hierarchical database, a flat database, and/or another type of database as may be known in the art to store and organize data as described herein.

The storage may be local, remote, or a combination. The storage components may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The storage components may have back-up capability built-in. Communications with the storage components may be over a network, such as Network 902, or communications may involve a direct connection between the various storage components and System 930, as depicted in FIG. 9. The storage components may also represent cloud or other network based storage.

Figure 10:
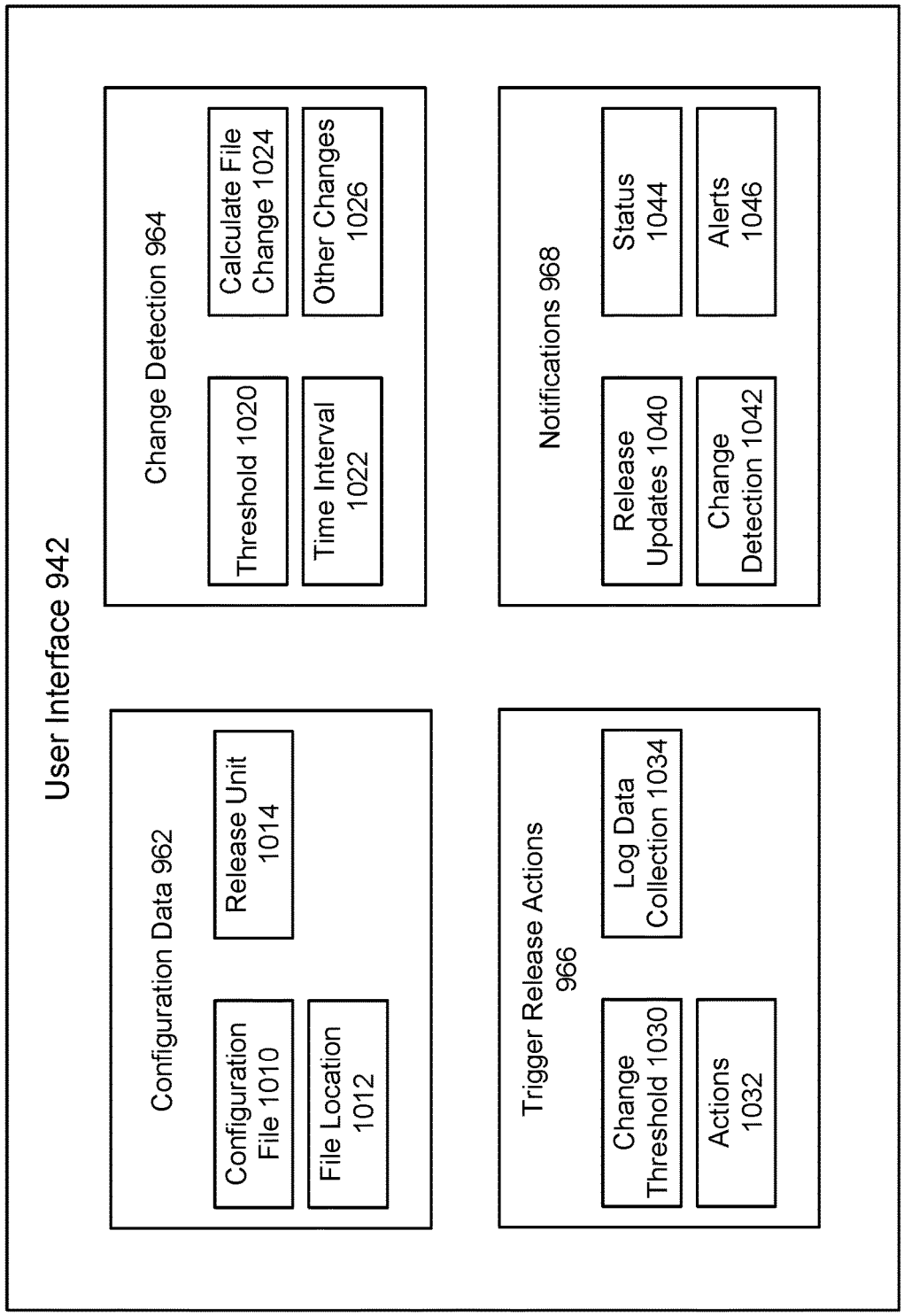
FIG. 10 is an exemplary interactive user interface, according to an embodiment of the present invention.

FIG. 10 is an exemplary interactive user interface, according to an embodiment of the present invention. As shown in FIG. 10, User Interface 942 may include various modules including Configuration Data 962, Change Detection 964, Trigger Release Actions 966 and Notifications 968. User Interface 942 may provide various views and displays.

Configuration Data 962 may provide configuration file 1010, file location 1012, release unit 1014, etc.

Change Detection 964 may provide details concerning detected changes. This may include identifying and applying thresholds for various detected changes. Change Detection 964 may include Thresholds 1020, Time Intervals 1022, Calculate File Change 1024, Other Changes 1026, etc.

Trigger Release Actions 966 may include Change Threshold 1030, Actions 1032, Log Data Collection 1034.

Notifications 968 may include Release Updates 1040, Change Detection 1042, Status 1044 and Alerts 1046.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner.

Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, PHP, C#, Go, Swift, Rust, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements a self-driven change detection release automation in software development life cycle, the system comprising:
    a memory component that stores change detection data;
    a user interface that receives inputs via a communication network;
    a system interface that is communicatively coupled to one or more servers in a server environment; and
    a computer processor coupled to the memory component, the user interface and the system interface and further programmed to perform:
    executing, via the system interface, a software release bot on the server environment, the server environment configured to run a current version of software, wherein the software release bot is configured to wake up at predetermined time intervals for performing a detection of one or more changes on the server environment;
    at each of the predetermined time intervals, automatically detecting, via a signal received from the software release bot, the one or more changes on the server environment, wherein the one or more changes on the server environment are automatically detected by the software release bot by comparing a current value to a previous value of at least one of a timestamp, checksum, message digest and hash, and wherein the one or more changes on the server environment include detection of a release of an updated version of the software on the server environment that is different from the current version of the software configured to run on the server environment;
    determining whether the current version of the software is currently being run on the server environment, wherein the current version of the software is determined to be currently being run when a series of actions are executed in response to the one or more changes that are automatically detected;
    determining a time point at which the one or more changes on the server environment were detected;
    determining whether the time point is within a predetermined threshold;
    when determining that the current version of the software is currently being run on the server environment and the time point is outside of the predetermined threshold:
        initiating a plurality corresponding actions defined in a configuration file, wherein the plurality of corresponding actions comprise:
        performing a pre-check process,
        executing a stop operation of the current version of the software, and
        executing a start operation of the updated version of the software;
        automatically saving one or more events as an events log;
        performing one or more post-check validations;
        generating a notification of one or more release updates; and
        communicating, via the communication network, the notification to at least one recipient; and
    when determining that the current version of the software is not currently being run on the server environment or that the current version of the software is being run within the predetermined threshold, taking no action, wherein the current version of the software is determined to be currently not being run when no action is executed in response to the one or more changes that are automatically detected.

2. The system of claim 1, wherein the one or more changes exceed a predefined threshold.

3. The system of claim 1, wherein the software release bot handles release activities defined in the configuration file.

4. The system of claim 1, wherein the configuration file comprises release metadata.

5. The system of claim 1, wherein the software release bot generates a release events log for change audits.

6. The system of claim 1, wherein the software release bot comprises a local lightweight program that self-detects one or more changes.

7. The system of claim 1, wherein the software release bot performs one or more actions comprising: wake up local release jobs, restart software, validate change and validate process.

8. The system of claim 1, wherein the notification of one or more release updates further comprises change detection data and status information.

9. The system of claim 1, wherein the at least one recipient provides a response to the notification.

10. The system of claim 1, wherein the software release bot is integrated with a scheduling tool, and wherein the predetermined time intervals is 15 minute intervals.

11. A method that implements a self-driven change detection release automation in software development life cycle, the method comprising:
    executing, via a system interface, a software release bot on a server environment wherein the system interface is communicatively coupled to one or more servers in the server environment, the server environment configured to run a current version of software, wherein the software release bot is configured to wake up at predetermined time intervals for performing a detection of one or more changes on the server environment;
    at each of the predetermined time intervals, automatically detecting, via a signal received from the software release bot, the one or more changes on the server environment, wherein the one or more changes on the server environment are automatically detected by the software release bot by comparing a current value to a previous value of at least one of a timestamp, checksum, message digest and hash, and wherein the one or more changes on the server environment include detection of a release of an updated version of the software on the server environment that is different from the current version of the software configured to run on the server environment;

determining whether the current version of the software is currently being run on the server environment, wherein the current version of the software is determined to be currently being run when a series of actions are executed in response to the one or more changes that are automatically detected;

determining a time point at which the one or more changes on the server environment were detected;

determining whether the time point is within a predetermined threshold;

when determining that the current version of the software is currently being run on the server environment and the time point is outside of the predetermined threshold:

initiating, via a computer processor, a plurality of corresponding actions defined in a configuration file, wherein the plurality of corresponding actions comprise:

performing a pre-check process, executing a stop operation of the current version of the software, and executing a start operation of the updated version of the software;

automatically saving one or more events as an events log;

performing one or more post-check validations;

generating a notification of one or more release updates; and communicating, via a communication network, the notification to at least one recipient; and when determining that the current version of the software is not currently being run on the server environment or that the current version of the software is being run within the predetermined threshold, taking no action, wherein the current version of the software is determined to be currently not being run when no action is executed in response to the one or more changes that are automatically detected.

12. The method of claim 11, wherein the one or more changes exceed a predefined threshold.

13. The method of claim 11, wherein the software release bot handles release activities defined in the configuration file.

14. The method of claim 11, wherein the configuration file comprises release metadata.

15. The method of claim 11, wherein the software release bot generates a release events log for change audits.

16. The method of claim 11, wherein the software release bot comprises a local lightweight program that self-detects one or more changes.

17. The method of claim 11, wherein the software release bot performs one or more actions comprising: wake up local release jobs, restart software, validate change and validate process.

18. The method of claim 11, wherein the notification of one or more release updates further comprises change detection data and status information.

19. The method of claim 11, wherein the at least one recipient provides a response to the notification.

20. The method of claim 11, wherein the software release bot is integrated with a scheduling tool, and wherein the predetermined time intervals is 15 minute intervals.

\* \* \* \* \*